(12) United States Patent
Wang et al.

(10) Patent No.: US 10,246,988 B2
(45) Date of Patent: Apr. 2, 2019

(54) REAL-TIME TRAJECTORY ESTIMATION WITH MULTI-STATION ANALYSIS

(71) Applicant: HRL Laboratories, LLC, Malibu, CA (US)

(72) Inventors: Shuoqin Wang, Westlake Village, CA (US); Logan D. Sorenson, Thousand Oaks, CA (US); Hung Nguyen, Los Angeles, CA (US); David Chang, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 129 days.

(21) Appl. No.: 15/279,390

(22) Filed: Sep. 28, 2016

(65) Prior Publication Data

US 2017/0314384 A1    Nov. 2, 2017

Related U.S. Application Data

(60) Provisional application No. 62/233,936, filed on Sep. 28, 2015.

(51) Int. Cl.
*E21B 7/04* (2006.01)
*G01C 21/16* (2006.01)
*E21B 47/022* (2012.01)
*E21B 47/024* (2006.01)

(52) U.S. Cl.
CPC .............. *E21B 47/024* (2013.01); *E21B 7/04* (2013.01); *E21B 47/022* (2013.01); *G01C 21/16* (2013.01)

(58) Field of Classification Search
CPC ..................................................... E21B 47/024
See application file for complete search history.

(56) References Cited

U.S. PATENT DOCUMENTS

| 4,205,379 A | 5/1980 | Fox et al. |
| 6,453,239 B1 * | 9/2002 | Shirasaka ............. E21B 47/022 175/45 |
| 9,804,288 B2 * | 10/2017 | Estes ..................... G01V 3/26 |
| 2005/0022404 A1 | 2/2005 | Ash et al. |
| 2009/0222209 A1 * | 9/2009 | Morys ................... E21B 47/022 702/9 |

(Continued)

FOREIGN PATENT DOCUMENTS

WO    WO 2015-119766    8/2015

OTHER PUBLICATIONS

Notification of Transmittal of International Search Report and the Written Opinion of the International Searching Authority for PCT/US2016/054256; dated Jan. 11, 2017.

(Continued)

*Primary Examiner* — Manuel L Barbee
*Assistant Examiner* — Raymond L Nimox
(74) *Attorney, Agent, or Firm* — Tope-McKay & Associates

(57) ABSTRACT

Described is a system for position estimation. A set of raw sensor outputs are acquired from a sensor of a platform. The set of raw sensor outputs are stored in non-transitory memory. A set of optimized sensor measurements is generated by deducing errors in the raw sensor outputs using an unconstrained optimization algorithm. The system determines a position of the platform based on the set of optimized sensor measurements.

22 Claims, 10 Drawing Sheets

(56) References Cited

U.S. PATENT DOCUMENTS

| | | | | |
|---|---|---|---|---|
| 2010/0211318 A1* | 8/2010 | Brooks | ................ | G01V 11/00 |
| | | | | 702/9 |
| 2014/0163888 A1* | 6/2014 | Bowler | ................ | G01V 11/00 |
| | | | | 702/9 |
| 2014/0214387 A1 | 7/2014 | Tilke | | |
| 2015/0331138 A1* | 11/2015 | Estes | ...................... | G01V 3/26 |
| | | | | 324/346 |
| 2016/0201449 A1* | 7/2016 | Dirksen | ................... | E21B 7/10 |
| | | | | 702/9 |
| 2016/0282513 A1* | 9/2016 | Holmes | ............... | E21B 47/022 |

OTHER PUBLICATIONS

International Search Report of the International Searching Authority for PCT/US2016/054256; dated Jan. 11, 2017.
Written Opinion of the International Searching Authority for PCT/US2016/054256; dated Jan. 11, 2017.
Professor Angus Jamieson, et al., "Introduction to wellbore positioning," University of the Highlands and Islands, 2012, Version: V05.08.16, pp. 1-197.
Notification Concerning Transmittal of International Preliminary Report on Patentability for PCT/US2016/054256; dated Nov. 2, 2017.
International Preliminary Report on Patentability for PCT/US2016/054256; dated Nov. 2, 2017.

* cited by examiner

Rig Surface Information

Dip Angle (deg): 70

Declaration Angle (deg): 10

Amp of Gravity (G): 1

Amp of Mag Field (nT): 5000

● True North  ○ Grid North

Convergence Angle (deg): ☐

| Magnetometer Correction | | |
|---|---|---|
| | Correction Factor | Scale Factor |
| X | -51.6638 | 0.9901 |
| Y | 98.2272 | 0.9901 |
| Z | -200.6828 | 0.9950 |

FIG. 5

| Meas'd D | Gx | Gy | Gz | Bx | By | Bz |
|---|---|---|---|---|---|---|
| 657.4 | -0.0461 | 0.0124 | 0.9989 | -8877 | 16377 | 46870 |
| 758.6 | -0.1014 | 0.0233 | 0.9946 | -11457 | 16890 | 46108 |
| 855.9 | -0.1531 | 0.0383 | 0.9875 | -13834 | 17583 | 45208 |
| 855.9 | -0.1057 | -0.1172 | 0.9875 | 22190 | 3864 | 45194 |
| 855.9 | 0.1190 | -0.1036 | 0.9875 | 4396 | -22157 | 45202 |
| 855.9 | 0.0718 | -0.1405 | 0.9875 | -20306 | -9654 | 45188 |
| 855.9 | -0.1576 | 0.0084 | 0.9875 | -16951 | 14599 | 45185 |
| 855.9 | -0.0949 | 0.1261 | 0.9875 | 383 | 22389 | 45198 |
| 855.3 | -0.1576 | 0.0083 | 0.9875 | 18508 | -12943 | 45187 |
| 855.0 | -0.2013 | 0.0679 | 0.9772 | -14894 | 19378 | 44108 |
| 955.3 | -0.2531 | 0.0836 | 0.9638 | -17217 | 20076 | 42933 |
| 955.2 | -0.3016 | 0.1062 | 0.9475 | -19357 | 21077 | 41533 |
| 955.8 | -0.3165 | 0.0166 | 0.9484 | 25933 | -12307 | 41607 |
| 1055.6 | -0.2954 | 0.2198 | 0.9297 | -13099 | 27170 | 40423 |
| 1154.9 | -0.3430 | 0.2387 | 0.9085 | -15210 | 27997 | 39103 |
| 1154.9 | -0.3896 | 0.2588 | 0.8839 | -17227 | 28855 | 37602 |
| 1255.2 | -0.4616 | 0.0244 | 0.8867 | 30942 | -13055 | 37803 |
| 1355.8 | -0.5358 | 0.1410 | 0.8325 | -29932 | 22299 | 33952 |
| 1457.6 | -0.5751 | 0.1670 | 0.8003 | -31430 | 23381 | 31790 |
| 1556.6 | -0.5907 | 0.0310 | 0.8063 | 37210 | -11938 | 32138 |
| 1657.5 | -0.5269 | 0.3563 | 0.7716 | -23884 | 32726 | 30057 |
| 1657.7 | -0.7081 | 0.0371 | 0.7051 | 41607 | -11823 | 26251 |
| 1955.0 | -0.4923 | 0.5615 | 0.6651 | -17203 | 40837 | 24100 |
| 2056.5 | -0.5726 | 0.6249 | 0.5306 | -20124 | 43009 | 16999 |
| 2154.9 | -0.8224 | 0.0431 | 0.5672 | 45336 | -12007 | 18998 |
| 2256.3 | -0.2060 | 0.8201 | 0.5339 | 31114 | 47211 | 17511 |
| 2555.9 | -0.2113 | 0.8236 | 0.5264 | 2886 | 47336 | 17187 |
| 2656.4 | -0.2113 | 0.8236 | 0.5264 | 2898 | 47346 | 17182 |
| 2958.8 | -0.7908 | 0.0414 | 0.6106 | 43968 | -12437 | 21782 |
| 3227.1 | -0.4683 | 0.7164 | 0.5172 | -12667 | 45893 | 16651 |
| 3308.3 | -0.8200 | 0.0430 | 0.5707 | 45026 | -12325 | 19547 |
| 3326.4 | -0.4793 | 0.7099 | 0.5161 | -13612 | 45729 | 16331 |
| 3326.4 | -0.4556 | 0.7298 | 0.5097 | -12463 | 46318 | 15577 |
| 3975.8 | -0.8131 | 0.0426 | 0.5806 | 45216 | -11773 | 19456 |

FIG. 9

REAL-TIME TRAJECTORY ESTIMATION WITH MULTI-STATION ANALYSIS

CROSS-REFERENCE TO RELATED APPLICATIONS

This is a Non-Provisional patent application 62/233,936, filed in the United States on Sep. 28, 2015, entitled, "Real Time Trajectory Estimation with Multi-Station Analysis," the entirety of which is hereby incorporated by reference.

BACKGROUND OF INVENTION

(1) Field of Invention

The present invention relates to a system for real-time trajectory estimation and, more particularly, to a system for real-time trajectory estimation that functions across various configurations and platforms

(2) Description of Related Art

Surveying of boreholes is commonly performed by drill-string-embedded sensor systems containing sets of three orthogonal accelerometers and magnetometers, and possibly gyroscopes. Ideally, these sensors provide the attitudes (i.e., position relative to a frame reference) of the drill-string at each measurement location from which the trajectory is deduced. These raw sensor outputs may have deterministic instrument errors called bias errors (or scale factor errors). For the case of magnetometers, these errors can be categorized as remnant errors, which appear as a bias error, and induced errors, which appear as scale factor errors. The errors may change with the working environments, such as the presence of local magnetic interference. Further, these errors contribute to uncertainties in the estimated trajectories.

There are several techniques that can be utilized to identify sensor errors based on this comparison, such as short collar technique and cluster shot technique. A recent development is the use of multi-station analysis (MSA). MSA is now a benchmark method of determining the biases and scale factor errors in magnetic sensors. MSA finds the corrections for each axis and then minimizes their disagreement over the whole survey up to the current survey point.

Presently, MSA employs a sampling technique such as the Monte Carlo method, where a range of biases and scale factors on each axis are sampled on which the theoretical magnetometer readings of each axis can be deduced. The true biases and scale factors are then the minimum difference between the deduced and measured magnetic fields. The accuracy and speed of the method may be subjected to the number and the range of samples. Additionally, current sampling techniques require user interaction in defining sampling range and resolution. A description of MSA can be found in U.S. Pat. No. 8,280,638, which proposes the implementation of MSA using a sampling method in the solution space, which is equivalent to the Monte Carlo method.

Thus, a continuing need exists for an improved version of MSA which is more robust and lighter in computational expense than conventional algorithms typically based on Monte Carlo analysis. Additionally, a need exists for a system that is less dependent on user input and is, therefore, more suitable for autonomous applications.

SUMMARY OF INVENTION

The present invention relates to a system for real-time trajectory estimation and, more particularly, to a system for real-time trajectory estimation that functions across various configurations and platforms. The system comprises one or more processors and a memory having instructions such that when the instructions are executed, the one or more processors perform multiple operations. A set of raw sensor outputs are acquired from a sensor of a platform. The set of raw sensor outputs are stored in non-transitory memory. A set of optimized sensor measurements is generated by deducing errors in the raw sensor outputs using an unconstrained optimization algorithm. The system determines a position of the platform based on the set of optimized sensor measurements.

In another aspect, the platform is a vehicle having an inertial navigation system.

In another aspect, the platform is a drilling well of a drilling site.

In another aspect, drilling attitudes at all drilling sites are determined using the set of optimized sensor measurements. A drilling trajectory at all drilling sites is determined using the determined drilling attitudes.

In another aspect, the unconstrained optimization algorithm is used to deduce at least one of magnetometer sensor errors, accelerometer sensor errors, and gyroscope sensor errors.

In another aspect, the unconstrained optimization algorithm minimizes an objective function:

$$f_{obj} = \sum_{i=1}^{N}(MT - \widehat{MT}_i)^2 \cdot \sum_{i=1}^{N}(DA - \widehat{DA}_i)^2 \cdot \sum_{i=1}^{N}(G - \hat{G}_i)^2,$$

where MT represents a measured magnetic field strength at the drilling site, $\widehat{MT}$ represents a theoretical magnetic field strength at the drilling site, DA represents a measured dip angle at the drilling site, $\widehat{DA}$ represents a theoretical dip angle at the drilling site, G represents a measured gravity field at the drilling site, $\hat{G}$ represents a theoretical gravity field at the drilling site, and N is the number of times the drilling site has been surveyed.

In another aspect, if accelerometer sensors errors are relatively small compared with magnetometer sensor errors, then the unconstrained optimization algorithm minimizes an objective function:

$$f_{obj} = \sum_{i=1}^{N}(MT - \widehat{MT}_i)^2 \cdot \sum_{i=1}^{N}(DA - \widehat{DA}_i)^2,$$

where MT represents a measured magnetic field strength at the drilling site, $\widehat{MT}$ represents a theoretical magnetic field strength at the drilling site, DA represents a measured dip angle at the drilling site, $\widehat{DA}$ represents a theoretical dip angle at the drilling site, and N is the number of times the drilling site has been surveyed.

In another aspect, if gyroscope sensor errors are available, then the unconstrained optimization algorithm minimizes an objective function:

$$f_{obj} = \sum_{i=1}^{N}(ER - \widehat{ER}_i)^2,$$

where ER is a measured earth rotation rate, $\widehat{ER}$ is a theoretical earth rotation rate, and N is the number of times the drilling site has been surveyed.

In another aspect, a drilling trajectory is determined from the set of optimized sensor measurements, and the drilling trajectory is described by a set of points having coordinates on the trajectory of the curvature, wherein the coordinates of the set of points are determined according to the following:

$$\vec{S}_{i+jd\theta} = \vec{S}_i + \frac{R(\cos(jd\theta) - 1)}{\sin(jd\theta)}(\hat{u}_i \cos(jd\theta) - \hat{u}_{i+1}) + R\hat{u}_i \sin(jd\theta),$$

where $\vec{S}_i$ represents the Cartesian coordinates of the ith drilling site, wherein the Cartesian coordinates are in a local navigation frame and originate in the start of the drilling well, $\vec{S}_{i+jd\theta}$ is the Cartesian coordinates of a point with $jd\theta$ angle away from the ith drilling site, wherein there are N points between the ith drilling site and (i+1)th drilling site with j=1, 2, . . . N and with $d\theta = \theta/N$, where $\theta$ is the total angle between the ith drilling site and the (i+1)th drilling site, and wherein $\hat{u}_i$ and $\hat{u}_{i+1}$ are unit vectors of attitudes of the ith drilling site and the (i+1)th drilling $\hat{u}_i$ site, respectively.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 4 is an illustration of a graphic interface used to input the surface information of a drilling site according to some embodiments of the present disclosure;

FIG. 5 is an illustration of regressed parameters of magnetometers based on the optimization scheme according to some embodiments of the present disclosure;

FIG. 9 is a table illustrating a database including raw sensor data according to some embodiments of the present disclosure.

DETAILED DESCRIPTION

Figure 1:
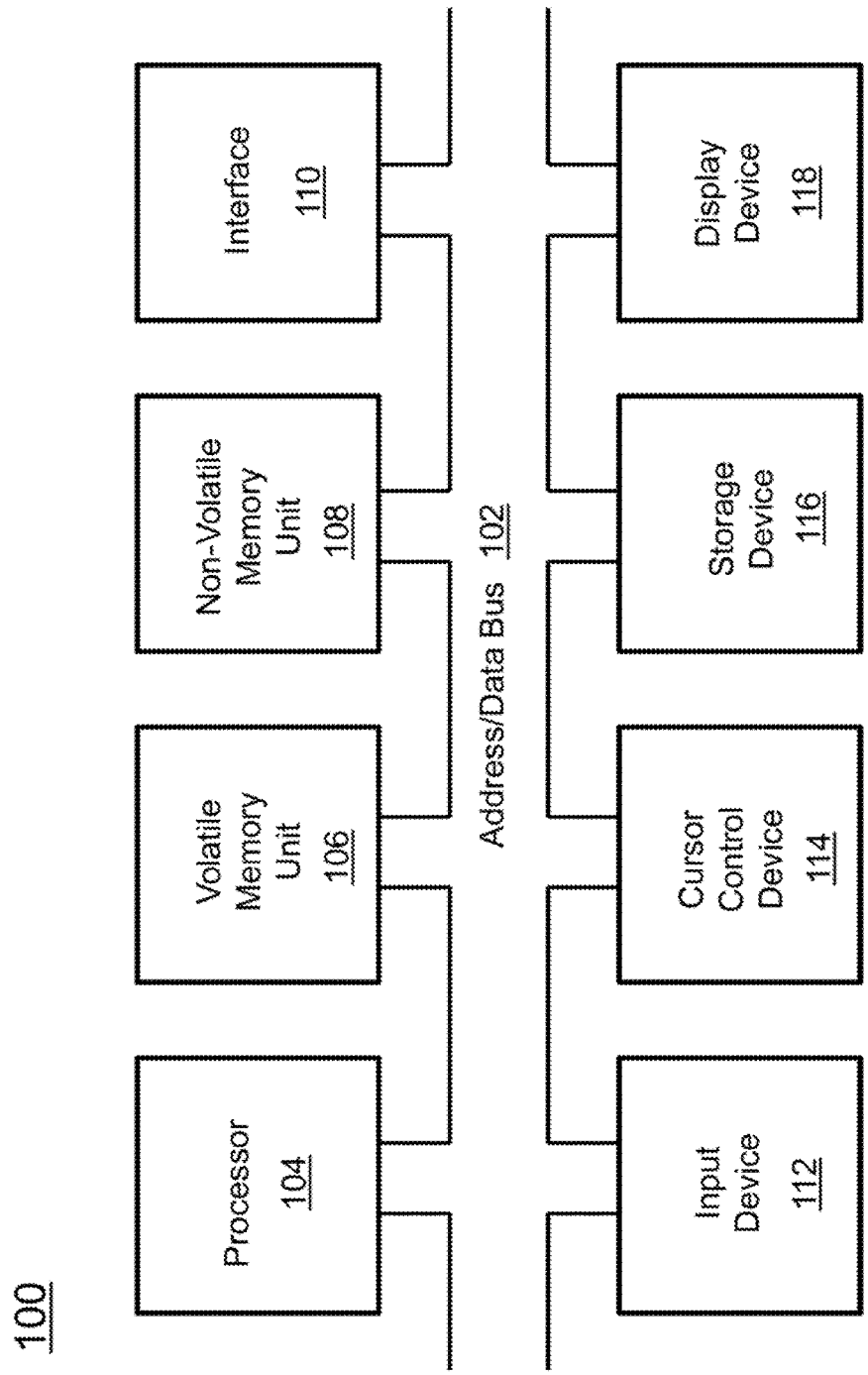
FIG. 1 is a block diagram depicting the components of a system for real-time trajectory estimation according to some embodiments of the present disclosure.

The present invention relates to a system for real-time trajectory estimation and, more particularly, to a system for real-time trajectory estimation that functions across various configurations and platforms The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, a description of the various principal aspects of the present invention is provided. Subsequently, an introduction provides the reader with a general understanding of the present invention. Finally, specific details of the present invention are provided to give an understanding of the specific aspects.

(1) Principal Aspects

Various embodiments of the invention include three "principal" aspects. The first is a real-time trajectory estimation system. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
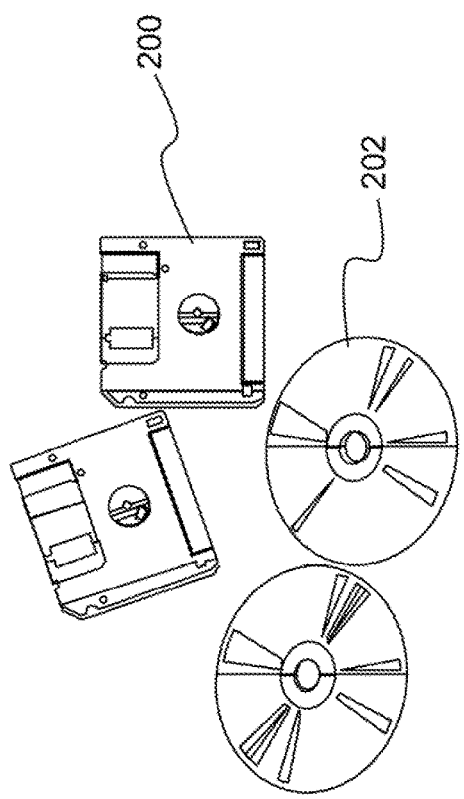
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Introduction

The present disclosure is directed towards the surveying of wellbore orientation to improve positioning accuracy by eliminating errors caused by local interferences. Within the method according to embodiments of the present disclosure, a multi-station analysis (MSA) is realized with an unconstrained optimization algorithm. A unique objective function that mitigates the bias and scale factor errors associated with accelerometer, magnetometer, and gyroscope measurements will be described in further detail below. This enables the implementation of real-time trajectory estimation software in which a standard optimization algorithm is employed to minimize this objective function.

Surveying of boreholes is commonly performed by drill-string-embedded sensor systems containing sets of three orthogonal accelerometers and magnetometers, and possibly gyroscopes. Ideally, these sensors provide the attitudes of the drill-string at each measurement location from which the trajectory is deduced. These raw sensor outputs may have deterministic instrument errors called bias errors (or scale factor errors). For the case of magnetometers, these errors can be categorized as remnant errors, which appear as a bias error, and induced errors, which appear as scale factor errors. The errors may change with the working environments, such as the presence of local magnetic interference. Further, these errors contribute to uncertainties in the estimated trajectories.

The errors described above can be identified by comparing the theoretical physical parameters with the measured physical parameters based on raw sensor data. Non-limiting examples of raw sensor data include magnitudes and orientations of the local gravitational field, magnetic field vectors, and earth rotation rate. The differences in the values can be used to deduce the sensor errors.

There are several techniques that can be utilized to identify sensor errors based on this comparison, such as short collar technique and cluster shot technique. A recent development is the use of multi-station analysis (MSA). MSA is now a benchmark method of determining the biases and scale factor errors in magnetic sensors. MSA finds the corrections for each axis and then minimizes their disagreement over the whole survey up to the current survey point.

Presently, MSA employs the sampling technique, such as the Monte Carlo method, where a range of biases and scale factors on each axis are sampled on which the theoretical magnetometer readings of each axis can be deduced. The true biases and scale factors are then the minimum difference between the deduced and measured magnetic fields. The accuracy and speed of the method may be subjected to the number and the range of samples.

Based on measurements at each survey station, the attitude of the measurement-while-drilling (MWD) tool inside the bottom hole assembly/drill string can be estimated. Moreover, with the knowledge of the pipe length between the surfaces of each station, the trajectory of the drill string can be determined. The standard method of calculating the trajectory in the oil and gas industry is the normal minimum curvature method. However, it only provides the solution of coordinates of each survey station, but not the coordinates of the points that lie between two survey points. The method according to embodiments of the present disclosure extends the minimum curvature method to derive the coordinates of the points between the two stations. It can be applied to improve three-dimensional (3D) visualization of drilling trajectories, especially when the distance between two stations are too far away (for example, greater than 100 feet).

The invention described herein offers a different technique employing an unconstrained optimization method to deduce the errors using a new objective function to minimize the difference. Unlike the sampling method described above, which may require user interaction in defining sampling range and resolution, the method according to embodiments of the present disclosure is less dependent on user input and, therefore, is more suitable for autonomous applications. The unconstrained optimization method, known as simplex method, is a very mature, well-known algorithm and is commercially available. It is lighter and more suitable than Monte Carlo analysis for real-time survey application.

(3) Specific Details of the Invention

Figure 3:
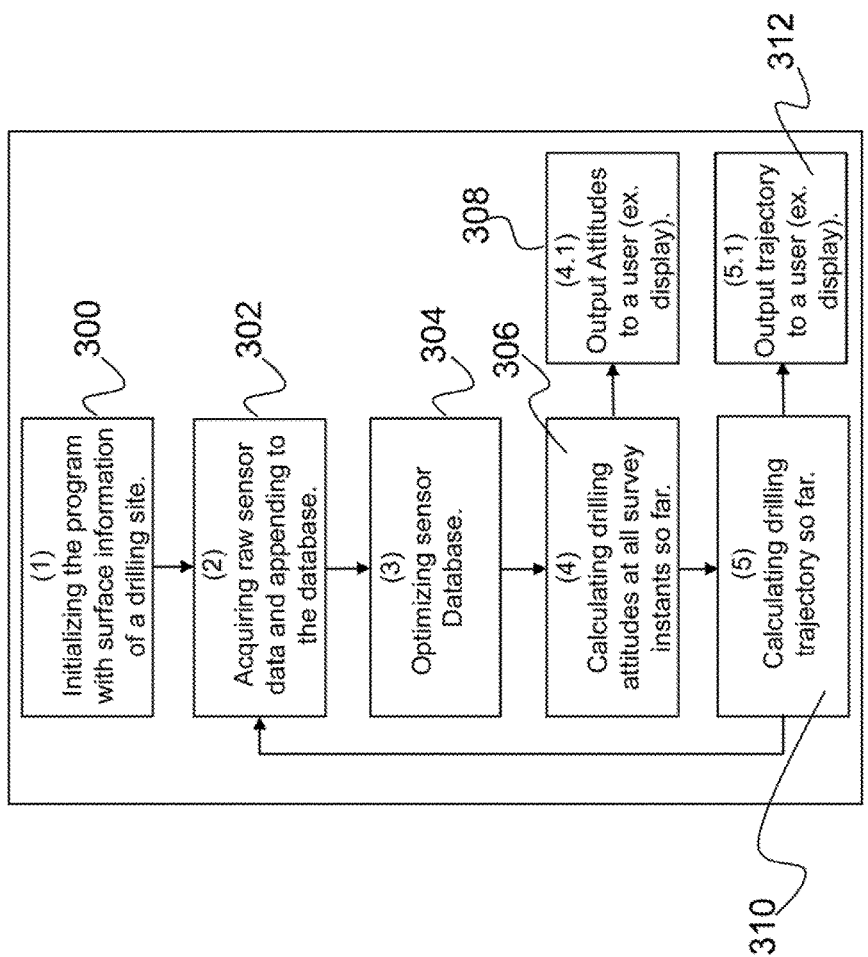
FIG. 3 is a flow diagram illustration real-time autonomous drilling orientation determination using multi-station analysis (MSA) according to some embodiments of the present disclosure.

The procedures underlying the process of real-time trajectory estimation are illustrated in the flow chart in FIG. 3. In a first procedure 300, any new codes or software that is written according to various embodiments of the present disclosure is initialized with surface information of a drilling site having a drilling well (or borehole). The program requires a user to input the surface information. The information may include, but is not limited to, coordinates of the drill site (latitude and longitude and altitude above mean sea level); grid convergence (direction of grid north relative to true north); geomagnetic declination (direction of magnetic north resolved to the true north); geomagnetic dip (vertical dip of the Earth's magnetic field vector below horizontal); geomagnetic field strength; and gravity.

In a second procedure 302, raw sensor data is acquired and appended to a sensor measurement database. The sensor measurement database includes all of the sensor data as a function of the measured depth. The sensor data are saved as columns of MD, $a_x$, $a_y$, $a_z$, $M_x$, $M_y$, $M_z$, and optionally columns of $g_x$, $g_y$, $g_z$. Non-limiting examples of raw sensor data include measured depth (MD); accelerometer data ($a_x$, $a_y$, $a_z$); and magnetometer data ($M_x$, $M_y$, $M_z$). The tool shall acquire gyroscope data ($g_x$, $g_y$, $g_z$) if available. The tool refers to any hardware sensor module (non-limiting examples of sensors include a magnetometer, gyro, and an accelerometer) that can provide sensor readings at certain temporal rates.

In a third procedure 304, the system generates optimized sensor measurements and appends them to the sensor measurement database (i.e., optimizing sensor measurement database). First, a case that gyroscope data are not included is considered. Next, a case where the gyroscope data are combined with accelerometer and magnetometer data is considered. Six new columns of data (with a hat on the letter) in the following equations were defined and regarded as the theoretically "real" sensor data that one needs to find, where each letter in the equation represents each column of data. The three parameters of $S_{ax}$, $S_{ay}$, $S_{az}$ are scalar errors of the accelerometer data, while $B_{Mx}$, $B_{My}$, $B_{Mz}$ and $S_{Mx}$, $S_{My}$, $S_{Mz}$ are bias (remnant error) and scalar errors of the magnetometer data, respectively. Accelerometer bias errors are small and do not typically impact the accuracy of the algorithm while coming at the cost of a more complicated optimization. Therefore, in this example, accelerometer biases are neglected, but can be included if it is found advantageous to do so in other applications.

$$\hat{a}_x = S_{ax} \cdot a_x$$

$$\hat{a}_y = S_{ay} \cdot a_y$$

$$\hat{a}_z = S_{az} \cdot a_z$$

$\hat{M}_x = S_{Mx} \cdot M_x + B_{Mx}$ $\hat{M}_y = S_{My} \cdot M_y + B_{My}$ $\hat{M}_z = S_{Mz} \cdot M_z + B_{Mz}$ The unconstrained optimization method is employed for determining these nine parameters. A robust algorithm of unconstrained optimization is well-known and commercially available; for example the function $f$ minsearch is provided by the Matlab© programming language/environment. Any unconstrained optimization method needs to define an objective function for minimization. The custom developed objective function for this case is defined as follows:

$$f_{obj} = \sum_{i=1}^{N} (MT - \widehat{MT}_i)^2 \cdot \sum_{i=1}^{N} (DA - \widehat{DA}_i)^2 \cdot \sum_{i=1}^{N} (G - \hat{G}_i)^2. \quad \text{(Eq. 1)}$$

In Eq. 1, the MT, DA, and G represent the total magnetic strength, the dip angle, and the total gravity field at the site, respectively. Their theoretical values are available to the program from the initialization procedure. The subscript "i" represents the $i^{th}$ row of the column vector. The N is the number of the survey times so far available. $\widehat{MT}_i$ is the $i^{th}$ row of the theoretical total magnetic strength, and is formulated as:

$\widehat{MT}_i = \sqrt{\hat{M}_{xi}^2 + \hat{M}_{yi}^2 + \hat{M}_{zi}^2}.$

Similarly, $\hat{G}_i$ is the $i^{th}$ row of the theoretical total gravity field, and is formulated as:

$\hat{G}_i = \sqrt{\hat{a}_{xi}^2 + \hat{a}_{yi}^2 + \hat{a}_{zi}^2}.$

The theoretical dip angle at the $i^{th}$ row is formulated as:

$\widehat{DA}_i = \sin^{-1}\left( \frac{\hat{M}_{xi}\hat{a}_{xi} + \hat{M}_{yi}\hat{a}_{yi} + \hat{M}_{zi}\hat{a}_{zi}}{\widehat{MT}_i \cdot \hat{G}_i} \right).$ The objective function to be minimized is a parametric function since it includes those parameters which are to be determined in minimizing the objective values. There may be several algorithms in searching for these parameters. In one embodiment, the algorithm that is used in the $f$ minsearch of Matlab© is the Nelder-Mead Simplex algorithm. Comparing with non-parametric sampling methods, such as Monte Carlo analysis, the former algorithm is much lighter and more reliable for real-time application.

In certain cases, the trajectory errors due to accelerometer errors are relatively small compared with magnetometer errors. In these cases, accelerometer errors can be safely ignored. Then, there are only six parameters that need to be identified, and the objective function (in Eq. 1) shall only include the first two terms at the right side of equation (total magnetic field and dip angle).

If gyroscope data are available, a similar optimization technique can be applied to minimize gyro errors due to constant bias and scaling errors. Minimizing gyro errors can be considered separately from those of the magnetometers, if gyro errors (i.e., the scale factors and bias of gyros) are much smaller.

$\hat{g}_x = S_{gx} \cdot g_x + B_{gx}$ $\hat{g}_y = g \cdot g_y + B_{gy}$ $\hat{g}_z = S_{gz} \cdot g_z + B_{gz}$ The objective function for gyro measurement is defined as follows:

$$f_{obj} = \sum_{i=1}^{N} (ER - \widehat{ER}_i)^2$$

with ER representing the surveyed earth rotation rate, and $\widehat{ER}_i = \sqrt{\hat{g}_{xi}^2 + \hat{g}_{yi}^2 + \hat{g}_{zi}^2}.$ In a fourth procedure 306, drilling attitudes at all survey instants so far are calculated. Once the sensor measurement database is optimized (element 304), the drilling attitudes are determined using the data. The drilling attitudes are represented by the inclination angles (I) and azimuth angles (A). The inclination angle at the $i^{th}$ station is determined by formulas provided in a standard text book. These two formulas are copied below. Inclination angle is determined as follows:

$$I_i = \tan^{-1}\left( \frac{\sqrt{a_{xi}^2 + a_{yi}^2}}{a_{zi}^2} \right),$$

and azimuth angle is determined as follows:

$$A = \tan^{-1} \frac{(a_{xi}M_{yi} - a_{yi}M_{xi})\sqrt{a_{xi}^2 + a_{yi}^2 + a_{zi}^2}}{((a_{xi}^2 + a_{yi}^2)M_{zi} - a_{zi}(a_{xi}M_{xi} + a_{yi}M_{yi}))}.$$

The above azimuth angle is the magnetic northing angle. The true northing angle would be the sum of the magnetic northing angle and the declination angle (an input from initialization procedure), i.e., $A_{true} = A + A_{declination}$. The grid north angle is the sum of the magnetic northing angle and the difference of the declination angle and the convergence angle (an input from initialization procedure), i.e., $A_{grid} = A + (A_{declination} - A_{convergence})$. Following calculation of the drilling attitudes (element 306), the drilling attitudes are output to a user (element 308) via a display (e.g., computer monitor).

In a fifth procedure 310, the drilling trajectory at the whole survey instants is calculated. It is the industry standard to use the normal minimum curvature in determining the coordinates of each station based on direction vectors of all of the stations. The following provides the coordinates of each station and the mathematical description of the curves. The trajectory description is useful for highly accurate visualization of the 3-D trajectory, especially if the distance between two stations is too long. Assume the $i^{th}$ station's coordinates are known, such as $\vec{S}_i = (d_N, d_E, d_D)$, where $d_N$, $d_E$, $d_D$ is the relative distance from the origin to the $i^{th}$ station in the north, east, and down direction, respectively. The mathematical formulas to calculate the $(i+1)^{th}$ station are given as follows:

The Cartesian unit vector of the ith station is the following:

$\hat{u}_i = (\sin I_i \sin A_i, \sin I_i \cos A_i, \cos I_i);$

The Cartesian unit vector of the (i+1)th station is the following:

$$\hat{u}_{i+1} = (\sin I_{i+1} \cdot \sin A_{i+1},\ \sin I_{i+1} \cdot \cos A_{i+1},\ \cos I_{i+1});$$

The angle to subtend the curvature between these two stations is the following:

$$\theta = \cos^{-1}(\hat{u}_i \cdot \hat{u}_{i+1});\text{ and}$$

The radius of the curvature is the following:

$$R = (MD_{i+1} - MD_i)/\theta.$$

Therefore the coordinates of the $(i+1)^{th}$ station are the following:

$$\vec{S}_{i+1} = \vec{S}_i + R \cdot \tan\left(\frac{\theta}{2}\right) \cdot (\hat{u}_i + \hat{u}_{i+1}).$$

By following the above calculations, all of the coordinates of the stations (drilling sites) can be calculated. It should be noted that depending on the definition of the north direction (magnetic north, true north, or grid north), the appropriate azimuth angles should be used in the above calculations. The coordinates are in the local navigation frame (North, East, and down) and originate in the start of the drilling well. The trajectory of the curvature between two stations can be mathematically described by discrete points of coordinates on the trajectory. If the arc between the $i^{th}$ and the $(i+1)^{th}$ station is divided by N points, and the angles away from the $i^{th}$ station are $jd\theta$, with $j=1, 2, \ldots N$ and with $d\theta = \theta/N$, then the coordinates of these points can be calculated with:

$$\vec{S}_{i+jd\theta} = \vec{S}_i + \frac{R(\cos(jd\theta)-1)}{\sin(jd\theta)}(\hat{u}_i \cos(jd\theta) - \hat{u}_{i+1}) + R\hat{u}_i \sin(jd\theta). \quad \text{Eq. 2}$$

Eq. 2 is derived based on the same minimum curvature method, with detailed derivation omitted here.

In order to verify the technique, the algorithm was coded in a Matlab-based standalone (in Windows OS) software. Then, the software was fed with the data generated from a drilling simulator (or any sensor simulator that can provide simulated sensor outputs). Since the bias and scalar factor errors of the sensor data can be predetermined and added upon the sensor data provided by the simulator, the software could be evaluated by comparing the difference between the estimated bias and scalar factors with the predetermined bias and scalar factors.

FIG. 4 is an illustration of a graphic interface 400 a user would use to input the surface information of the rig/drilling site (i.e., the first procedure, element 300 in FIG. 3). The received data would be used to initialize the program.

Experimental data, which were generated from a drilling simulator, are used in validating the software. The raw sensor data include the columns of the measured depth, accelerometer data in three axes, and magnetometer data in three axes, as shown in the table of FIG. 10.

FIG. 5 is a table illustrating regressed parameters of the magnetometers based on the optimization scheme according to embodiments of the present disclosure. The code and associated algorithm are based upon the equations discussed in the third procedure (element 304). Accelerometer errors were ignored in the simulator; therefore, only six parameters of magnetometer errors are found in the output. The predetermined parameters of correction factors $B_{Mx}$, $B_{My}$, $B_{Mz}$ are within ±20 nT difference from the regressed parameters, and the scale factors $S_{Mx}$, $S_{My}$, $S_{Mz}$ were within 1% difference from the regressed scale factors.

Figure 6A:
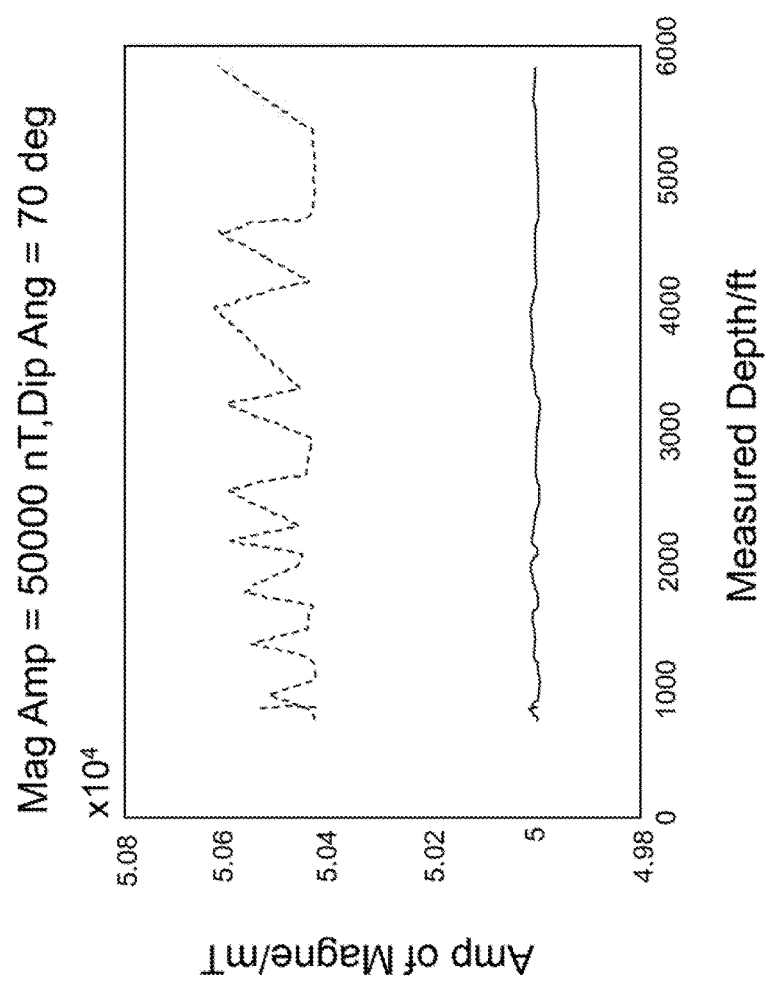
FIG. 6A is a plot illustrating a calculated total magnetic strength as a function of the measured depth without and with sensor data correct using the optimization according to some embodiments of the present disclosure.
Figure 6B:
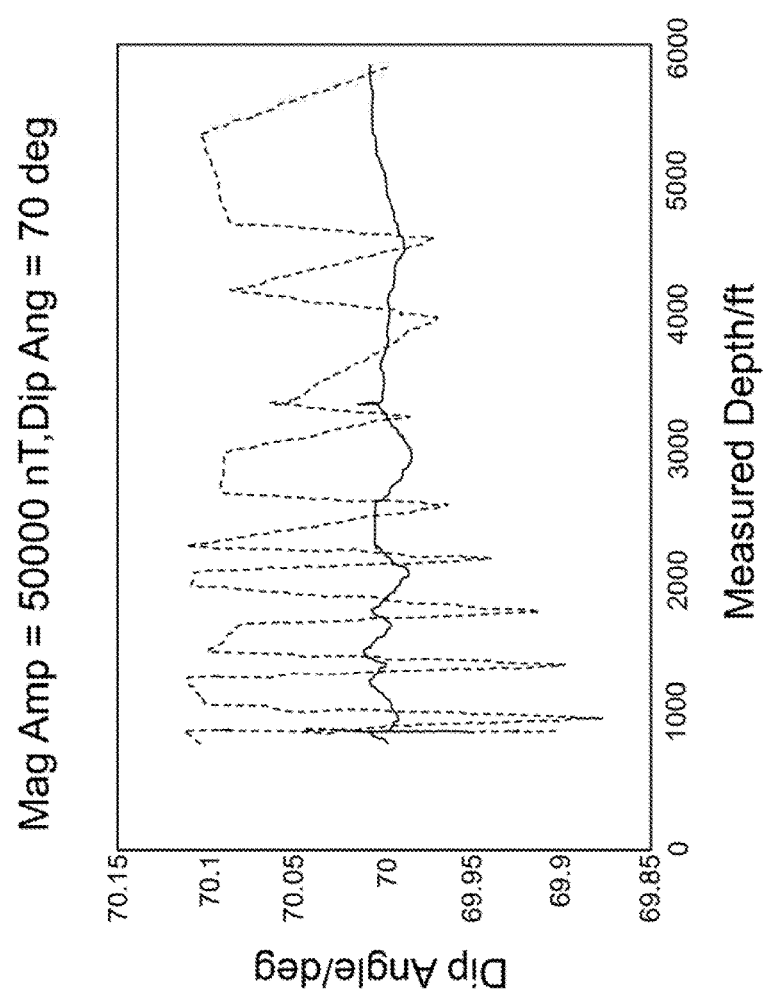
FIG. 6B is a plot illustrating a calculated dip angle as a function of the measured depth without and with sensor data correction using the optimization according to some embodiments of the present disclosure.

FIGS. 6A and 6B depict plots of the calculated total magnetic field strength (FIG. 6A) and the dip angle (FIG. 6B) as a function of the measured depth without (dashed curves) and with (solid curves) sensor data correction using the optimization of the present invention.

Figure 7:
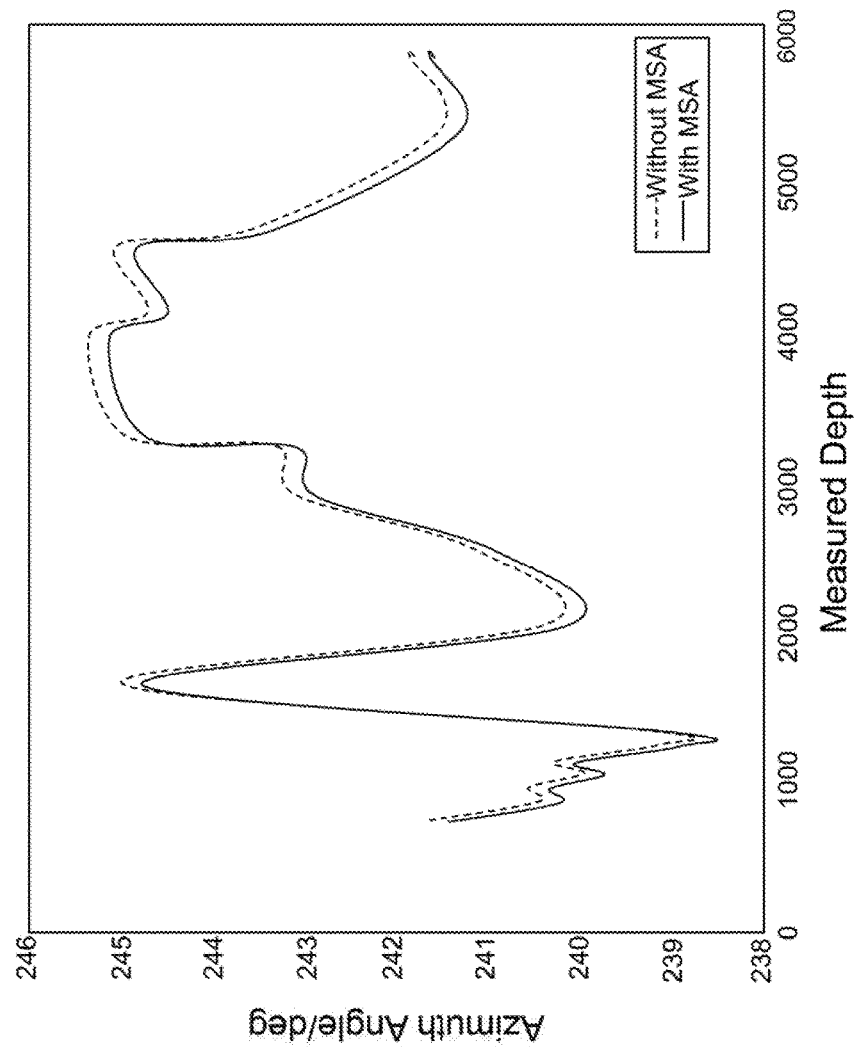
FIG. 7 is a plot illustrating a calculated azimuth angle as a function of the measured depth without and with sensor data correction using the optimization according to some embodiments of the present disclosure.

FIG. 7 depicts plots of the calculated azimuth angle as a function of the measured depth without (dashed curve) and with (solid curve) sensor data correction using the optimization according to embodiments of the present disclosure. There are about half degree difference at the end of the trajectory. The calculation of the azimuth angles are based on the fourth procedure (element 306 in FIG. 3), described above.

Figure 8:
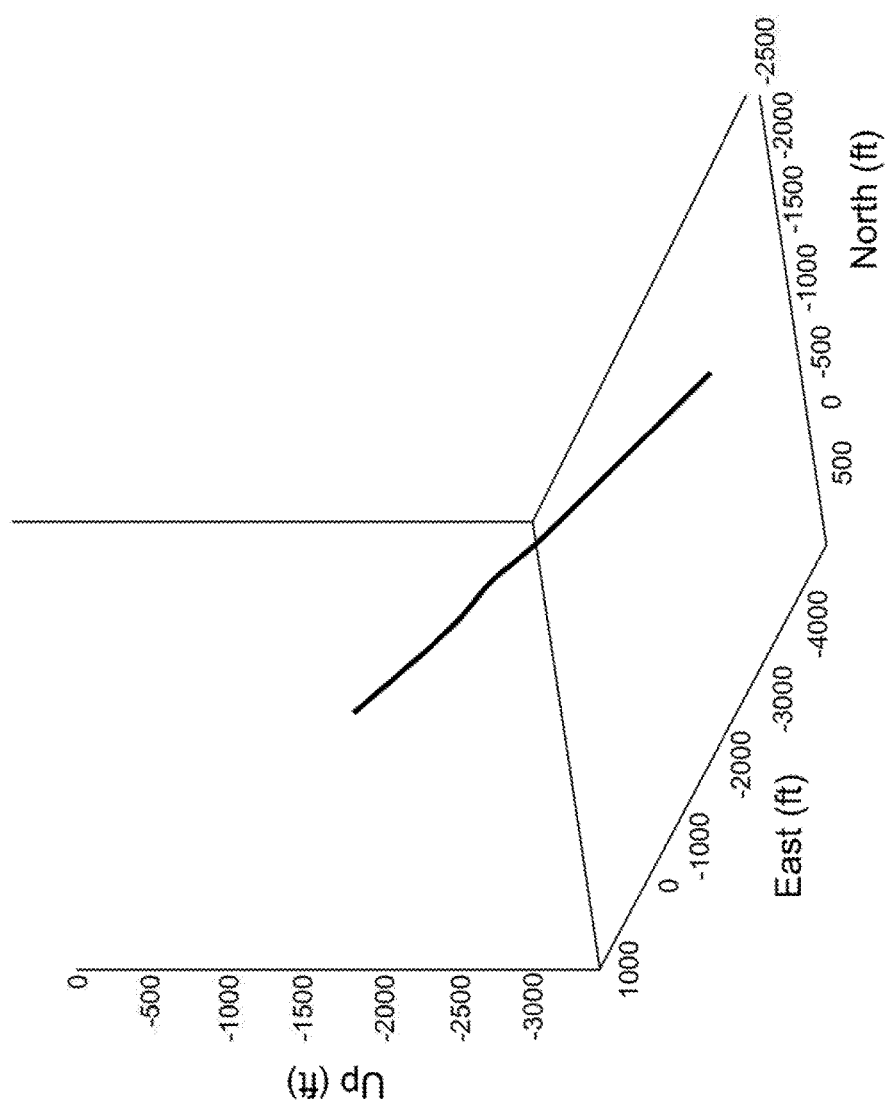
FIG. 8 is a plot illustration an estimated trajectory according to some embodiments of the present disclosure.

FIG. 8 depicts a demonstration of the estimated trajectory (solid curve) according to the equations in the fifth procedure (element 310 in FIG. 3).

In one embodiment, the system described herein is a physical tool containing a microprocessor, a memory unit, a suite of accelerometers (greater than or equal to 3 axes in number), a suite of magnetometers (greater than or equal to 3 axes in number), and, optionally, a suite of gyroscopes (greater than or equal to 3 axes in number), wherein the sensors (accelerometers, magnetometers, and gyroscopes) pass their values digitally, or through an analog signal conditioning chain, to the microprocessor. The sensor measurement database is stored on the memory unit, and the real-time trajectory estimation algorithm with MSA is performed by the onboard microprocessor.

In one embodiment, the present invention is a software technique that can provide fast and accurate trajectory estimation in real-time (and also post-facto surveying) across various configurations and platforms. For the purposes of this application, "platform" can be the surface of a geographical site (e.g., drilling site), a vehicle (e.g., car, truck), or any device/surface for which position can be estimated via the method described herein. This technique can be used in a standalone software tool application for wellbore surveying that provides faster and more reliable (convergence guaranteed) position estimation than the state-of-the-art tools. It can be also used as an aiding sensor for a real-time autonomous drilling system. For example, given the trajectory results, the drilling system can determine a more accurate position for drilling which improves positioning accuracy by eliminating errors caused by local interferences. In one embodiment, "position" is referring to the coordinates of the drill bit. The position can be expressed as the latitude, longitude, and depth with earth center as the origin. Alternatively, the position can be expressed as the distance of north/south, of east/west, and of depth with the surface rig site as the origin.

Additionally, the invention can be incorporated into the inertial navigation system in vehicles in order to enhance the accuracy of position estimation at the dead time of a global positioning system (GPS). The prior art based on Monte Carlo analysis techniques cannot be used in such an autonomous system due to its poor reliability and requirement of human interaction.

While the real-time trajectory estimation algorithm according to embodiments of the present disclosure is well suited for the energy sector, it has far reaching applicability toward other fields that require autonomous navigation. This invention applies to navigation products or vehicles/platforms requiring precise navigation. Further, the invention is commercially applicable to the oil and gas industry.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for position estimation, the system comprising:
   a measurement-while-drilling (MWD) tool;
   at least one accelerometer sensor and at least one magnetometer sensor positioned on the MWD tool;
   one or more processors in communication with the at least one accelerometer sensor and the at least one magnetometer sensor and a non-transitory computer-readable medium having executable instructions encoded thereon such that when executed, the one or more processors perform operations of:
      acquiring a set of raw sensor outputs from the at least one accelerometer sensor and the at least one magnetometer sensor on the MWD tool and storing the set of raw sensor outputs in non-transitory memory;
      generating a set of optimized sensor measurements by deducing errors in the raw sensor outputs using an unconstrained optimization algorithm, wherein the unconstrained optimization algorithm minimizes an objective function that is a product of sums of differences squared between the raw sensor outputs and theoretical values;
      determining a position of the MWD tool based on the set of optimized sensor measurements; and
      causing a bottom hole assembly to drill based on the position of the MWD tool.

2. The system as set forth in claim 1, wherein the MWD tool is located in a drilling well of a drilling site.

3. The system as set forth in claim 2, wherein the one or more processors further perform operations of:
   determining drilling attitudes at all drilling sites using the set of optimized sensor measurements; and
   determining a drilling trajectory at all drilling sites using the determined drilling attitudes.

4. The system as set forth in claim 1, wherein the unconstrained optimization algorithm is used to deduce at least one of magnetometer sensor errors, accelerometer sensor errors, and gyroscope sensor errors.

5. The system as set forth in claim 2, wherein the unconstrained optimization algorithm minimizes the following objective function:

$$f_{obj} = \sum_{i=1}^{N}(MT - \widehat{MT}_i)^2 \cdot \sum_{i=1}^{N}(DA - \widehat{DA}_i)^2 \cdot \sum_{i=1}^{N}(G - \hat{G}_i)^2,$$

where MT represents a measured magnetic field strength at the drilling site, $\widehat{MT}$ represents a theoretical magnetic field strength at the drilling site, DA represents a measured dip angle at the drilling site, $\widehat{DA}$ represents a theoretical dip angle at the drilling site, G represents a measured gravity field at the drilling site, $\hat{G}$ represents a theoretical gravity field at the drilling site, and N is the number of times the drilling site has been surveyed.

6. The system as set forth in claim 2, wherein if accelerometer sensors errors are relatively small compared with magnetometer sensor errors, then the unconstrained optimization algorithm minimizes the following objective function:

$$f_{obj} = \sum_{i=1}^{N}(MT - \widehat{MT}_i)^2 \cdot \sum_{i=1}^{N}(DA - \widehat{DA}_i)^2,$$

where MT represents a measured magnetic field strength at the drilling site, $\widehat{MT}$ represents a theoretical magnetic field strength at the drilling site, DA represents a measured dip angle at the drilling site, $\widehat{DA}$ represents a theoretical dip angle at the drilling site, and N is the number of times the drilling site has been surveyed.

7. The system as set forth in claim 2, wherein if gyroscope sensor errors are available, then the unconstrained optimization algorithm minimizes the following objective function:

$$f_{obj} = \Sigma_{i=1}^{N}(ER - \widehat{ER}_i)^2,$$

where ER is a measured earth rotation rate, $\widehat{ER}$ is a theoretical earth rotation rate, and N is the number of times the drilling site has been surveyed.

8. The system as set forth in claim 2, wherein a drilling trajectory is determined from the set of optimized sensor measurements, and wherein the drilling trajectory is described by a set of points having coordinates on the trajectory of the curvature, wherein the coordinates of the set of points are determined according to the following:

$$\vec{S}_{i+jd\theta} = \vec{S}_i + \frac{R(\cos(jd\theta)-1)}{\sin(jd\theta)}(\hat{u}_i \cos(jd\theta) - \hat{u}_{i+1}) + R\hat{u}_i \sin(jd\theta),$$

where $\vec{S}_i$ represents the Cartesian coordinates of the ith drilling site, wherein the Cartesian coordinates are in a local navigation frame and originate in the start of the drilling well, $\vec{S}_{i+jd\theta}$ is the Cartesian coordinates of a point with jdθ angle away from the ith drilling site, wherein there are N points between the ith drilling site and (i+1)th drilling site with j=1, 2, . . . N and with dθ=θ/N, where θ is the total angle between the ith drilling site and the (i+1)th drilling site, and wherein $\hat{u}_i$ and $\hat{u}_{i+1}$ are unit vectors of attitudes of the ith drilling site and the (i+1)th drilling site, respectively.

9. A computer-implemented method for position estimation, comprising:
   an act of causing one or more processors in communication with at least one accelerometer sensor and at least one magnetometer sensor to execute instructions stored on a non-transitory memory such that upon execution, the one or more processors perform operations of:

acquiring a set of raw sensor outputs from the at least one accelerometer sensor and the at least one magnetometer sensor on a measurement-while-drilling (MWD) tool and storing the set of raw sensor outputs in non-transitory memory;

generating a set of optimized sensor measurements by deducing errors in the raw sensor outputs using an unconstrained optimization algorithm, wherein the unconstrained optimization algorithm minimizes an objective function that is a product of sums of differences squared between the raw sensor outputs and theoretical values;

determining a position of the MWD tool based on the set of optimized sensor measurements; and causing a bottom hole assembly to drill based on the position of the MWD tool.

10. The method as set forth in claim 9, wherein the MWD tool is located in a drilling well of a drilling site.

11. The method as set forth in claim 10, wherein the one or more processors further perform operations of:

determining drilling attitudes at all drilling sites using the set of optimized sensor measurements; and determining a drilling trajectory at all drilling sites using the determined drilling attitudes.

12. The method as set forth in claim 9, wherein the unconstrained optimization algorithm is used to deduce at least one of magnetometer sensor errors, accelerometer sensor errors, and gyroscope sensor errors.

13. The method as set forth in claim 10, wherein the unconstrained optimization algorithm minimizes the following objective function:

$$f_{obj} = \sum_{i=1}^{N}(MT - \hat{MT}_i)^2 \cdot \sum_{i=1}^{N}(DA - \hat{DA}_i)^2 \cdot \sum_{i=1}^{N}(G - \hat{G}_i)^2,$$

where MT represents a measured magnetic field strength at the drilling site, $\hat{MT}$ represents a theoretical magnetic field strength at the drilling site, DA represents a measured dip angle at the drilling site, $\hat{DA}$ represents a theoretical dip angle at the drilling site, G represents a measured gravity field at the drilling site, $\hat{G}$ represents a theoretical gravity field at the drilling site, and N is the number of times the drilling site has been surveyed.

14. The method as set forth in claim 10, wherein if accelerometer sensors errors are relatively small compared with magnetometer sensor errors, then the unconstrained optimization algorithm minimizes the following objective function:

$$f_{obj} = \sum_{i=1}^{N}(MT - \hat{MT}_i)^2 \cdot \sum_{i=1}^{N}(DA - \hat{DA}_i)^2,$$

where MT represents a measured magnetic field strength at the drilling site, $\hat{MT}$ represents a theoretical magnetic field strength at the drilling site, DA represents a measured dip angle at the drilling site, $\hat{DA}$ represents a theoretical dip angle at the drilling site, and N is the number of times the drilling site has been surveyed.

15. The method as set forth in claim 10, wherein if gyroscope sensor errors are available, then the unconstrained optimization algorithm minimizes the following objective function:

$$f_{obj} = \sum_{i=1}^{N}(ER - \hat{ER}_i)^2,$$

where ER is a measured earth rotation rate, $\hat{ER}$ is a theoretical earth rotation rate, and N is the number of times the drilling site has been surveyed.

16. The method as set forth in claim 10, wherein a drilling trajectory is determined from the set of optimized sensor measurements, and wherein the drilling trajectory is described by a set of points having coordinates on the trajectory of the curvature, wherein the coordinates of the set of points are determined according to the following:

$$\vec{S}_{i+jd\theta} = \vec{S}_i + \frac{R(\cos(jd\theta) - 1)}{\sin(jd\theta)}(\hat{u}_i \cos(jd\theta) - \hat{u}_{i+1}) + R\hat{u}_i \sin(jd\theta),$$

where $\vec{S}_i$ represents the Cartesian coordinates of the ith drilling site, wherein the Cartesian coordinates are in a local navigation frame and originate in the start of the drilling well, $\vec{S}_{i+jd\theta}$ is the Cartesian coordinates of a point with $jd\theta$ angle away from the ith drilling site, wherein there are N points between the ith drilling site and the (i+1)th drilling site with j=1, 2, ... N and with $d\theta = \theta/N$, where $\theta$ is the total angle between the ith drilling site and the (i+1)th drilling site, and wherein $\hat{u}_i$ and $\hat{u}_{i+1}$ are unit vectors of attitudes of the ith drilling site and the (i+1)th drilling site, respectively.

17. A computer program product for position estimation, the computer program product comprising:

computer-readable instructions stored on a non-transitory computer-readable medium that are executable by a computer having one or more processors in communication with at least one accelerometer sensor and at least one magnetometer sensor for causing the processor to perform operations of:

acquiring a set of raw sensor outputs from the at least one accelerometer sensor and the at least one magnetometer sensor on a measurement-while-drilling (MWD) tool and storing the set of raw sensor outputs in non-transitory memory;

generating a set of optimized sensor measurements by deducing errors in the raw sensor outputs using an unconstrained optimization algorithm, wherein the unconstrained optimization algorithm minimizes an objective function that is a product of sums of differences squared between the raw sensor outputs and theoretical values;

determining a position of the MWD tool based on the set of optimized sensor measurements; and causing a bottom hole assembly to drill based on the position of the MWD tool.

18. The computer program product as set forth in claim 17, wherein the MWD tool is located in a drilling well of a drilling site, and wherein the computer program product further comprises instructions for causing the one or more processors to perform operations of:

determining drilling attitudes at all drilling sites using the set of optimized sensor measurements; and determining a drilling trajectory at all drilling sites using the determined drilling attitudes.

19. The computer program as set forth in claim 17, wherein the unconstrained optimization algorithm minimizes the following objective function:

$$f_{obj} = \sum_{i=1}^{N} (MT - \widehat{MT}_i)^2 \cdot \sum_{i=1}^{N} (DA - \widehat{DA}_i)^2 \cdot \sum_{i=1}^{N} (G - \hat{G}_i)^2,$$

where MT represents a measured magnetic field strength at a drilling site, $\widehat{MT}$ represents a theoretical magnetic field strength at the drilling site, DA represents a measured dip angle at the drilling site, $\widehat{DA}$ represents a theoretical dip angle at the drilling site, G represents a measured gravity field at the drilling site, $\hat{G}$ represents a theoretical gravity field at the drilling site, and N is the number of times the drilling site has been surveyed.

20. The computer program as set forth in claim 17, wherein if accelerometer sensors errors are relatively small compared with magnetometer sensor errors, then the unconstrained optimization algorithm minimizes the following objective function:

$$f_{obj} = \sum_{i=1}^{N} (MT - \widehat{MT}_i)^2 \cdot \sum_{i=1}^{N} (DA - \widehat{DA}_i)^2,$$

where MT represents a measured magnetic field strength at a drilling site, $\widehat{MT}$ represents a theoretical magnetic field strength at the drilling site, DA represents a measured dip angle at the drilling site, $\widehat{DA}$ represents a theoretical dip angle at the drilling site, and N is the number of times the drilling site has been surveyed.

21. The computer program as set forth in claim 17, wherein if gyroscope sensor errors are available, then the unconstrained optimization algorithm minimizes the following objective function:

$$f_{obj} = \Sigma_{i=1}^{N}(ER - \widehat{ER}_i)^2,$$

where ER is a measured earth rotation rate, $\widehat{ER}$ is a theoretical earth rotation rate, and N is the number of times a drilling site has been surveyed.

22. The computer program as set forth in claim 17, wherein a drilling trajectory is determined from the set of optimized sensor measurements, and wherein the drilling trajectory is described by a set of points having coordinates on the trajectory of the curvature, wherein the coordinates of the set of points are determined according to the following:

$$\vec{S}_{i+jd\theta} = \vec{S}_i + \frac{R(\cos(jd\theta) - 1)}{\sin(jd\theta)}(\hat{u}_i \cos(jd\theta) - \hat{u}_{i+1}) + R\hat{u}_i \sin(jd\theta),$$

where $\vec{S}_i$ represents the Cartesian coordinates of an ith drilling site, wherein the Cartesian coordinates are in a local navigation frame and originate in the start of the drilling well, $\vec{S}_{i+jd\theta}$ is the Cartesian coordinates of a point with jdθ angle away from the ith drilling site, wherein there are N points between the ith drilling site and (i+1)th drilling site with j=1, 2, . . . N and with dθ=θ/N, where θ is the total angle between the ith drilling site and an (i+1)th drilling site, and wherein $\hat{u}_i$ and $\hat{u}_{i+1}$ are unit vectors of attitudes of the ith drilling site and the (i+1)th drilling site, respectively.

* * * * *